(12) United States Patent
Pan

(10) Patent No.: US 12,027,951 B1
(45) Date of Patent: Jul. 2, 2024

(54) STRONG MAGNETIC POWER GENERATION ON-BOARD POWER DEVICE

(71) Applicant: Huaxiang (Shenzhen) High-Tech Service Co., Ltd., Shenzhen (CN)

(72) Inventor: Jinzhong Pan, Zhongxiang (CN)

(73) Assignee: Huaxiang (Shenzhen) High-Tech Service Co., Ltd., Shenzhen (CN)

( * ) Notice: Subject to any disclaimer, the term of this patent is extended or adjusted under 35 U.S.C. 154(b) by 0 days.

(21) Appl. No.: 18/398,274

(22) Filed: Dec. 28, 2023

(51) Int. Cl.
*H02K 5/24* (2006.01)
(52) U.S. Cl.
CPC .................................... *H02K 5/24* (2013.01)
(58) Field of Classification Search
CPC ........................................................ H02K 5/24
See application file for complete search history.

(56) References Cited

U.S. PATENT DOCUMENTS

2015/0236562 A1* 8/2015 Schroeder ............... H02K 7/06
310/12.32

FOREIGN PATENT DOCUMENTS

| CN | 107040074 | A | * | 8/2017 | ............... H02K 5/10 |
| CN | 109630598 | A | * | 4/2019 | ............... F16F 13/00 |
| CN | 112186957 | A | * | 1/2021 | |
| CN | 112366885 | A | * | 2/2021 | |
| CN | 112421888 | A | * | 2/2021 | ............... H02K 5/04 |

OTHER PUBLICATIONS

Zhao, Machine Translation of CN109630598, Apr. 2019 (Year: 2019).*
Xiao, Machine Translation of CN107040074, Aug. 2017 (Year: 2017).*
Liu, Machine Translation of CN112421888, Feb. 2021 (Year: 2021).*
Zhu, Machine Translatoin of CN112186957, Jan. 2021 (Year: 2021).*
Lu, Machine Translation of CN112366885, Feb. 2021 (Year: 2021).*

* cited by examiner

*Primary Examiner* — Eric Johnson
(74) *Attorney, Agent, or Firm* — Jeenam Park

(57) ABSTRACT

The present disclosure discloses a strong magnetic power generation vehicle mounted power device including a strong magnetic power generation equipment, an installation seat installing on a vehicle body, a support plate fixedly connected to the strong magnetic power generation equipment; a socket providing on the support plate; a support rod inserted into the socket; a bottom plate providing on the installation seat; a spring fixedly connected between the bottom plate and the support plate; the socket is elliptical, and the support rod is also elliptical; a top end of the support rod extends out the socket; a top end of the support rod is fixedly connected with a threaded part; the threaded part is connected with a nut; the nut is provided with a rim; the rim abuts against the support plate. The present disclosure can reduce vibration generated by the strong magnetic power generation equipment.

8 Claims, 10 Drawing Sheets

STRONG MAGNETIC POWER GENERATION ON-BOARD POWER DEVICE

TECHNICAL FIELD

The present disclosure relates to the field of on-board power generation device technologies, and in particular, to a strong magnetic power generation on-board power device.

BACKGROUND

Strong magnetic on-board power generation device is a device that utilizes the magnetic field generated by strong magnets to generate electricity. Its core components include a magnetic field source, power generation mechanism, mechanical power transmission system, control system, power storage and distribution system, and other accessory equipment. The equipment can convert the motion of the vehicle into the rotation of the generator shaft, generating induced current through the relative motion between the generator shaft and coil, the control system can adjust the current of the magnetic field source to maintain the stability of the generator output; strong magnetic on-board power generation device can be widely used in various devices that require power, such as electric vehicles, hybrid electric vehicles, electric bicycles, electric motorcycles, etc., to provide power for on-board device and improve the vehicle's endurance and performance.

As disclosed in the utility model patent of CN217002056U, entitled with "vehicle mounted power generation system" and the publication date is Jul. 19, 2022. The vehicle mounted power generation system includes a base plate, which is provided with a damping device. The damping device is provided with a rectifying device, a heat dissipation device, a control device, a battery, a sound attenuation device, an engine, and a generator, and there is a transmission component between the engine and the generator, the sound attenuation device is connected to the engine, and the bottom plate is provided with a magnetic suction element. A shock absorber is arranged between the shock absorber device and the bottom plate, and a shell body is arranged on the bottom plate. The rectifier device, generator, heat dissipation device, battery, and shock absorber device are arranged inside the shell body, and a heat dissipation part is arranged on the shell body. The entire system structure of this utility model is compact and reasonable, which fully meets the portability requirements of the vehicle mounted power generation system, and has good shock absorption and heat dissipation effects.

However, in the above devices, there is no shock absorption and buffering structure installed. However, due to the operation of strong magnetic power generation device, significant vibration may occur, which may affect the comfort and safety of driving. Therefore, it is necessary to install shock absorption mechanisms for strong magnetic power generation device.

SUMMARY

The purpose of the present disclosure is to propose a strong magnetic power generation vehicle mounted power device to solve problems in the prior art.

In order to achieve the above objectives, the present disclosure adopts the following technical solution:

A strong magnetic power generation vehicle power device, which includes a strong magnetic power generation device and a vehicle body mounting seat, and further includes a support plate fixedly connected to the strong magnetic power generation device for supporting and fixing the strong magnetic power generation device; a socket, provided on the support plate; a support rod, inserted into the socket; a bottom plate, providing on the vehicle body mounting seat; where the bottom plate and the support plate are fixedly connected with a spring, respectively.

In an implementation mode of the present disclosure, the vehicle body mounting base is provide with a clamp plate, and the bottom plate is provided on the clamp plate.

In an implementation mode of the present disclosure, the socket is elliptical, the support rod is also elliptical, and a top of the support rod extends out of the socket.

In an implementation mode of the present disclosure, the top of the support rod is fixedly connected to a threaded part, and the threaded part is connected to a nut. The nut is provided with an edge ring, which is opposed to the support plate.

In an implementation mode of the present disclosure, the clamping plate is provided with a sealing cylinder, which is slidably connected with a piston block, which is fixedly connected to the bottom end of the support rod.

In an implementation mode of the present disclosure, the sealing cylinder is respectively connected with a first air pipe and a second air pipe.

In an implementation mode of the present disclosure, a connection between the first gas pipe and the sealing cylinder is disposed at a bottom of the sealing cylinder, and a connection between the second gas pipe and the sealing cylinder is disposed at a top of the sealing cylinder.

In an implementation mode of the present disclosure, the bottom plate is respectively provided with a first air outlet and a second air outlet, respectively; which are connected to the first and second air ducts.

In an implementation mode of the present disclosure, the top surface of the nut is provided with a gear, and the bottom plate is provided with a limit plate. The limit plate is attached to an edge of the support plate, and there is an opening on the limit plate. Both an upper side and a lower side of the opening are arranged as a curved surface. The opening is sliding connected to an inclined plate, and a sliding groove is provided on the inclined plate.

In an implementation mode of the present disclosure, the support plate is provided with a slide rail, and a positioning plate is installed on the slide rail. The positioning plate is provided with a threaded hole, and the threaded hole is connected with an insertion rod. The inclined plate slides inside the positioning plate, the insertion rod slides inside the sliding groove, and the limit plate is provided with a driving part. The positioning plate is fixedly connected to an output end of the driving part, and the inclined plate is fixedly connected with a push rod that matches the gear.

Compared with the prior art, the present disclosure provides a strong magnetic power generation vehicle power equipment, which has the following beneficial effects:

1. The strong magnetic power generation vehicle power equipment is equipped with an elliptical socket and support rod, which allows the strong magnetic power generation device to only vibrate up and down. Coupled with springs, it can effectively absorb and buffer the vibration generated by the strong magnetic power generation device or the vibration caused by external forces, which is conducive to improving driving comfort.
2. The strong magnetic power generation vehicle power equipment compresses the air at the upper and lower ends of the sealing cylinder through piston blocks, allowing the first and second air outlets to continuously blow air to the heat dissipation parts of the strong magnetic power generation device, thereby improving the heat dissipation effect of the strong magnetic power generation device.

3. The strong magnetic power generation vehicle power equipment, through the mutual cooperation of the inclined plate and the limit plate, enables the driving rod to rotate the gear when the strong magnetic power generation device shakes up and down, and then tighten the nut to prevent it from loosening, improving the stability of the strong magnetic power generation device's operation.

The non-involved parts of the strong magnetic power generation vehicle power equipment are the same as the existing technology or can be implemented using existing technology. The present disclosure can reduce the vibration generated by the strong magnetic power generation device, has good heat dissipation effect, and can also prevent nut loosening, ensuring the stability of the continuous operation of the strong magnetic power generation device.

Numeral reference: 1. Strong magnetic power generation device; 2. Support plate; 3. Body mounting seat; 4. Support rod; 5. Spring; 6. Nut; 7. Sealing cylinder; 8. First trachea; 9. Second trachea; 10. Bottom plate; 11. First air outlet; 12. Second air outlet; 13. Plywood; 14. Piston block; 15. Thread part; 16. Jack; 17. Edge loop; 18. Limit plate; 19. Gear; 20. Slant plate; 21. Chute; 22. Push rod; 23. Opening; 24. Curved surface; 25. Drive part; 26. Slide rail; 27. Positioning plate; 28. Insert rod; 29. Threaded holes.

DESCRIPTION OF EMBODIMENTS

The following will provide a clear and complete description of the technical solution in the embodiments of the present disclosure, in conjunction with the accompanying drawings. Obviously, the described embodiments are only a part of the embodiments of the present disclosure, not all of them.

In the description of the present disclosure, it should be understood that the terms "up", "down", "front", "back", "left", "right", "top", "bottom", "inside", "outside", etc. indicate that the orientation or position relationship based on the orientation or position relationship shown in the accompanying drawings is only for the convenience of describing the present disclosure and simplifying the description, rather than indicating or implying that the device or component referred to must have a specific orientation Constructed and operated in a specific orientation, therefore it cannot be understood as a limitation of the present disclosure.

Embodiment 1

Figure 1:
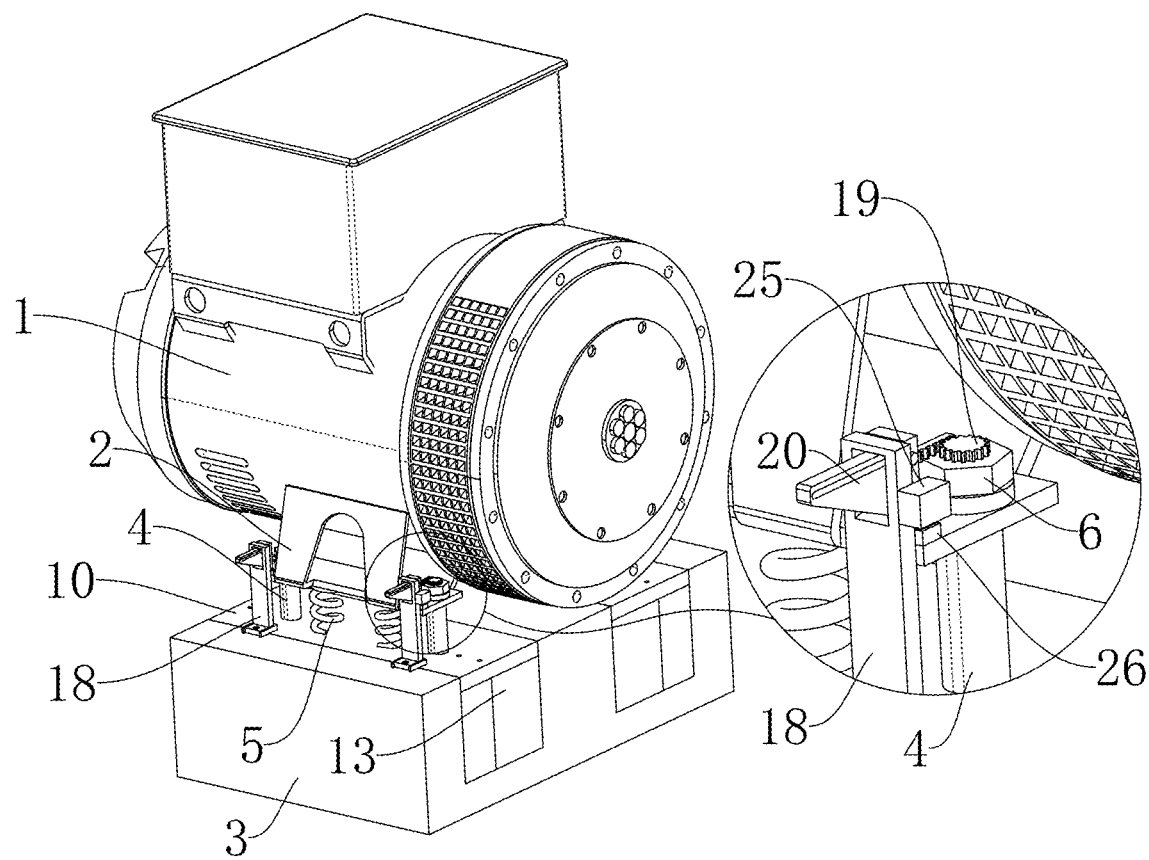
FIG. 1 is a schematic diagram of the overall structure of a strong magnetic power generation vehicle power equipment proposed in the present disclosure.
Figure 2:
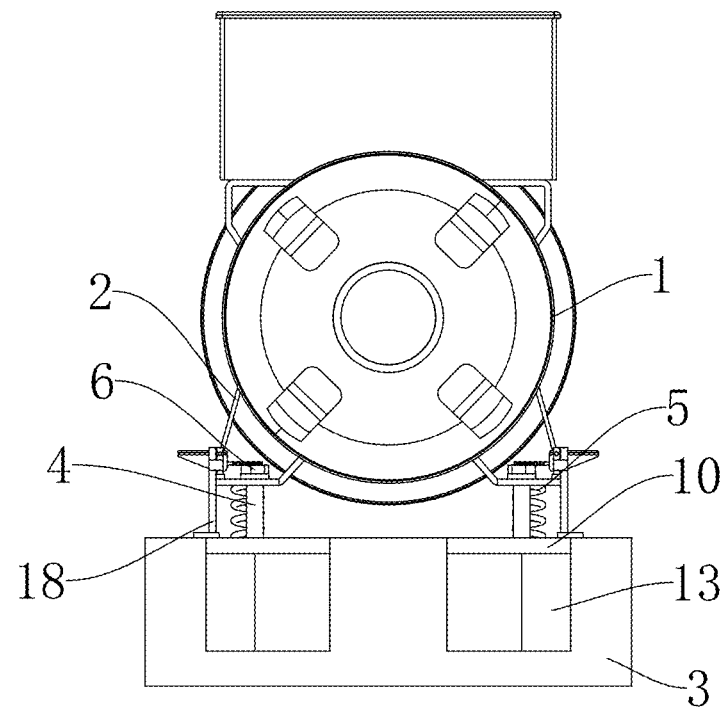
FIG. 2 is a side view of a strong magnetic power generation vehicle mounted power device proposed in the present disclosure.
Figure 3:
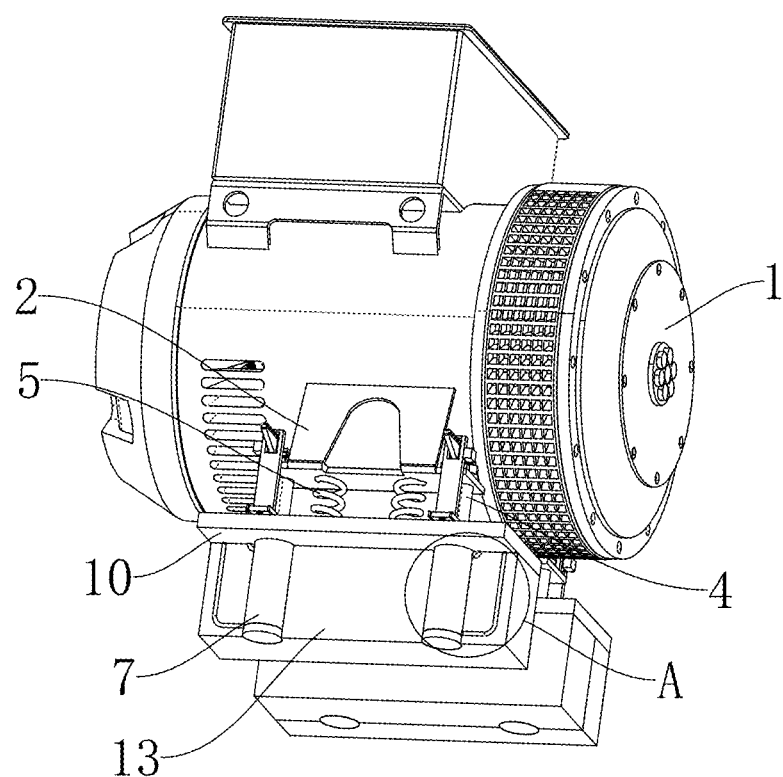
FIG. 3 is a schematic diagram of the structure inside the clamp plate of a strong magnetic power generation vehicle power equipment proposed in the present disclosure.
Figure 4:
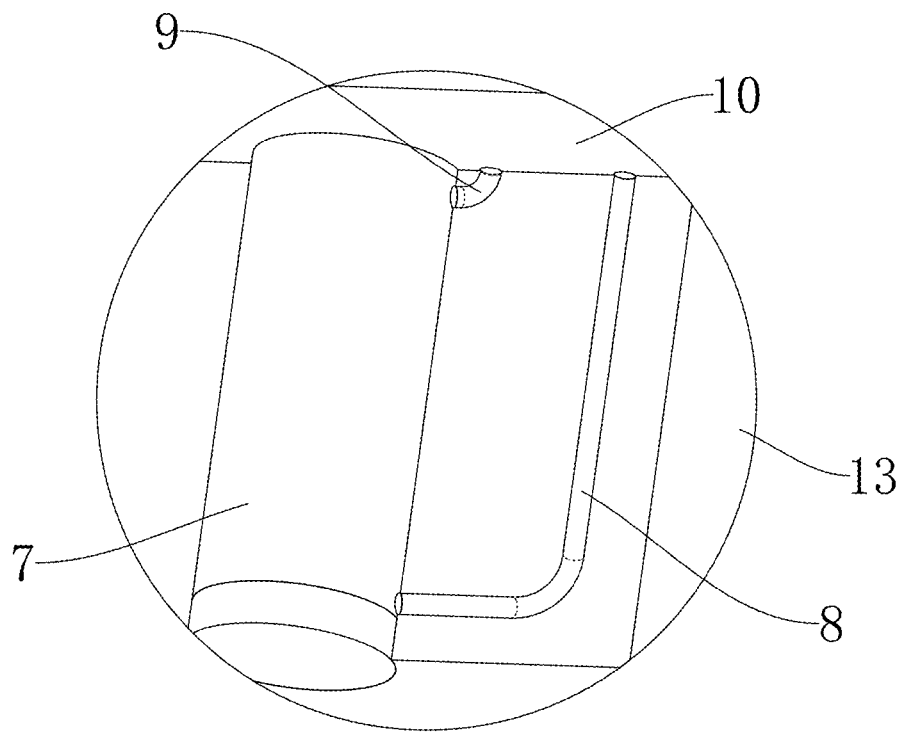
FIG. 4 is an enlarged structural schematic diagram of Part A in FIG. 3 of a strong magnetic power generation vehicle power equipment proposed by the present disclosure.
Figure 5:
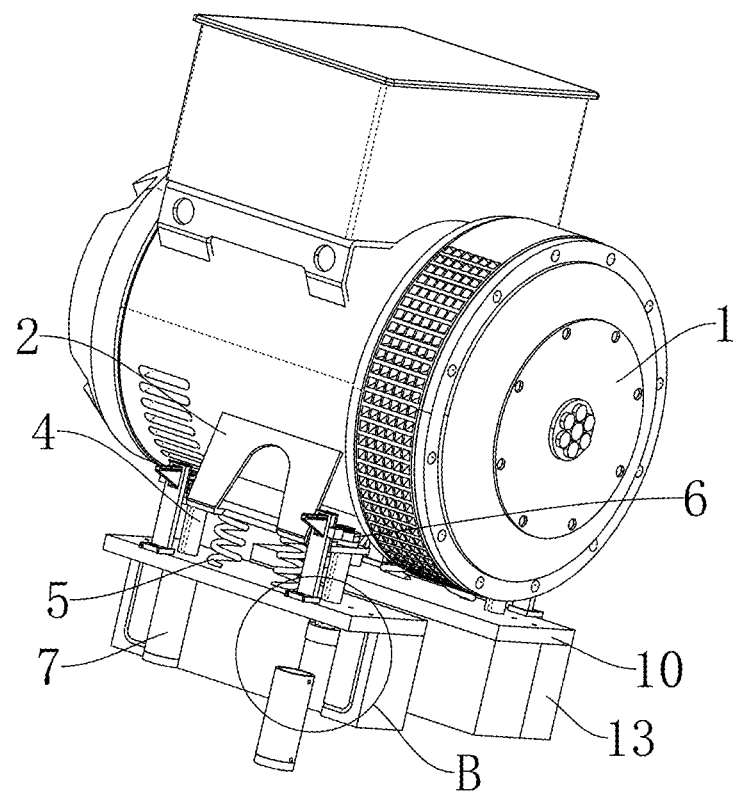
FIG. 5 is an exploded view of a strong magnetic power generation vehicle mounted power device proposed in the present disclosure.
Figure 6:
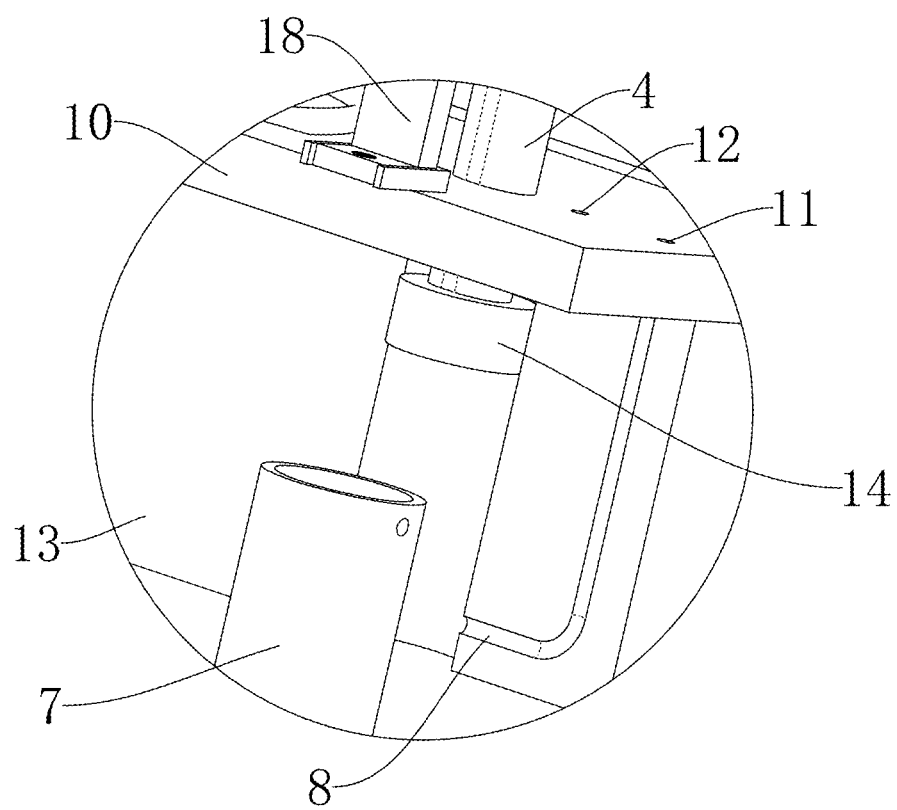
FIG. 6 is an enlarged structural schematic diagram of Part B in FIG. 5 of a strong magnetic power generation vehicle power equipment proposed by the present disclosure.
Figure 7:
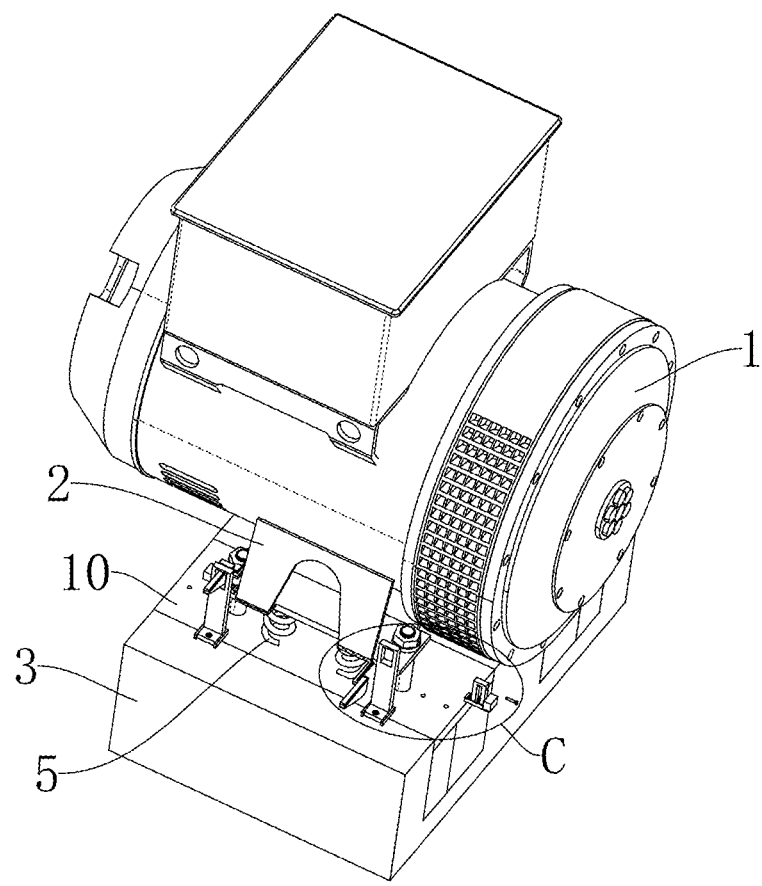
FIG. 7 is an exploded view 2 of a strong magnetic power generation vehicle mounted power device proposed in the present disclosure.
Figure 8:
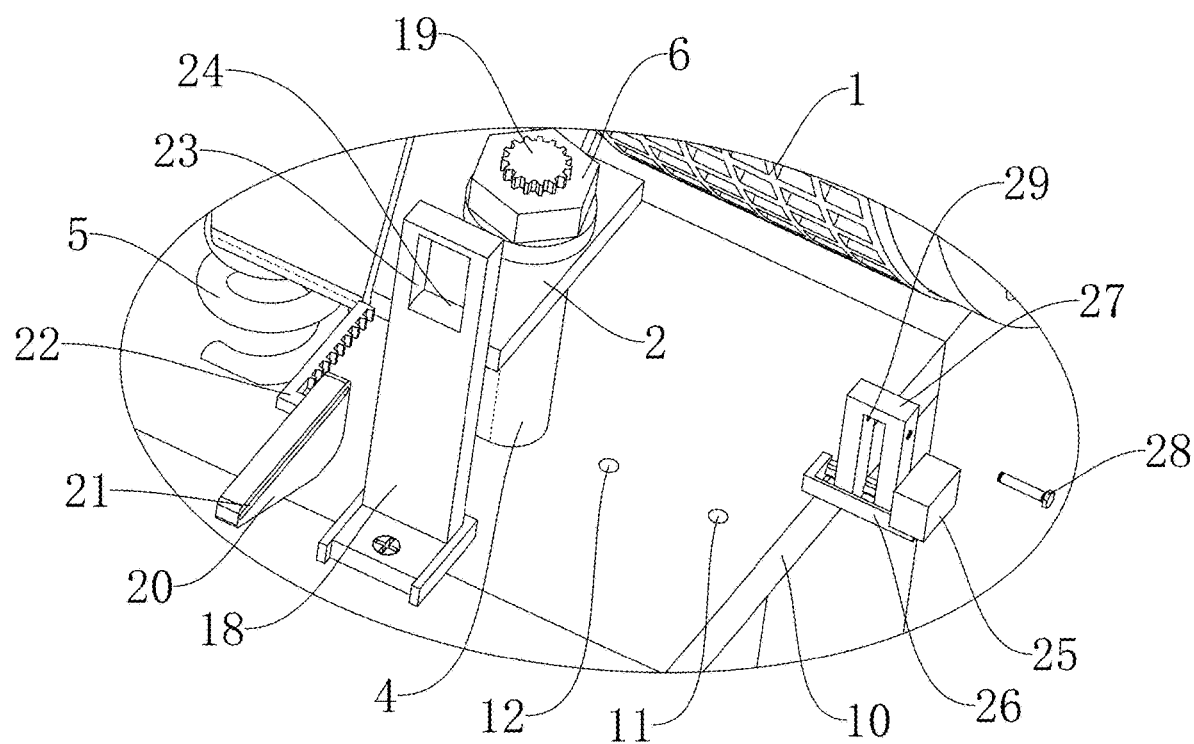
FIG. 8 is an enlarged structural schematic diagram of part C in FIG. 7 of a strong magnetic power generation vehicle power equipment proposed by the present disclosure.
Figure 9:
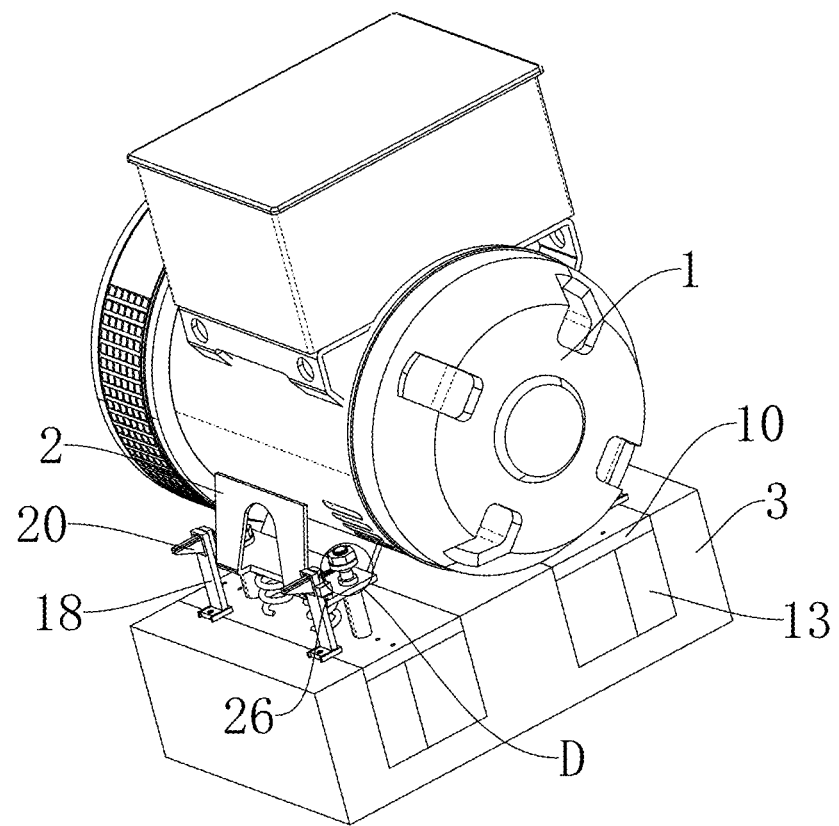
FIG. 9 is an exploded view III of a strong magnetic power generation vehicle mounted power device proposed in the present disclosure.
Figure 10:
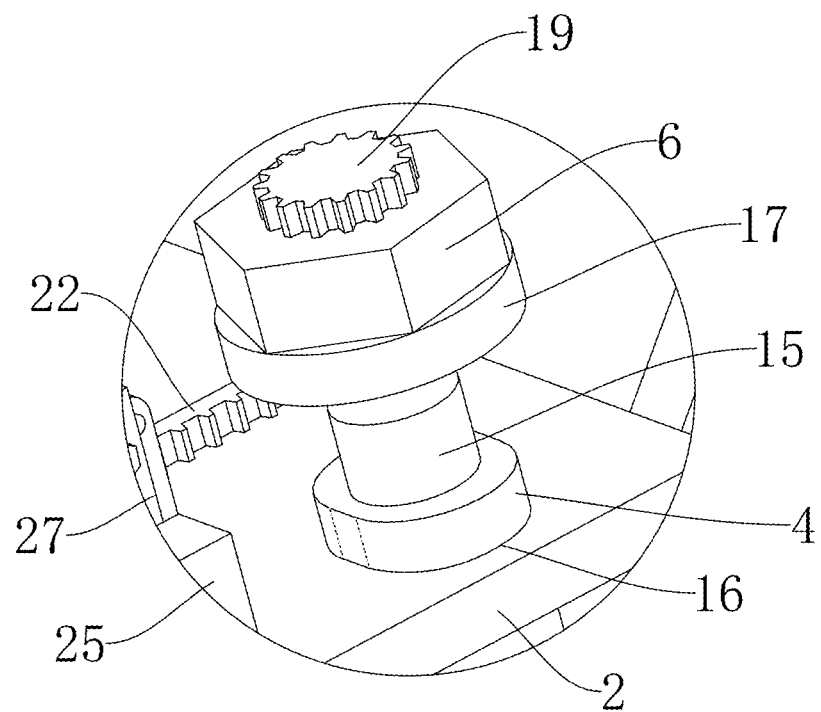
FIG. 10 is an enlarged structural schematic diagram of the D part in FIG. 9 of a strong magnetic power generation vehicle power equipment proposed by the present disclosure.

Referring to FIGS. 1 to 10, a strong magnetic power generation on-board power equipment includes a strong magnetic power generation device 1 and a vehicle body mounting base 3, and also includes a support plate 2 fixedly connected to the strong magnetic power generation device 1 for supporting and fixing the strong magnetic power generation device 1; Socket 16, arranged on support plate 2; Support rod 4, inserted into socket 16; The bottom plate 10 is arranged on the vehicle body mounting seat 3; A spring 5 is fixedly connected between the bottom plate 10 and the support plate 2.

In the present disclosure, when the user is in use, the strong magnetic power generation device 1 is installed on the vehicle body mounting seat 3, and the support plate 2 on the strong magnetic power generation device 1 is installed through the support rod 4. The support rod 4 is inserted into the socket 16 on the support plate 2, and the cross-sectional shape of the socket 16 and the support rod 4 is elliptical. When the strong magnetic power generation device 1 is subjected to vibration during operation, the strong magnetic power generation device 1 will not rotate or shake left and right, and can only follow the support rod 4 to vibrate up and down, When the strong magnetic power generation device 1 vibrates up and down with the support rod 4, the spring 5 absorbs energy and buffers the strong magnetic power generation device 1, and provides buffer protection for the strong magnetic power generation device 1.

Embodiment 2

Referring to FIGS. 1 to 10, it includes a strong magnetic power generation device 1 and a vehicle body mounting base 3, and also includes a support plate 2 fixedly connected to the strong magnetic power generation device 1 for supporting and fixing the strong magnetic power generation device 1; Socket 16, arranged on support plate 2; Support rod 4, inserted into socket 16; The bottom plate 10 is arranged on the vehicle body mounting seat 3; A spring 5 is fixedly connected between the bottom plate 10 and the support plate 2; The vehicle body mounting seat 3 is equipped with a clamp plate 13, and the bottom plate 10 is arranged above the clamp plate 13; Socket 16 is elliptical, and support rod 4 is also elliptical, with the top of support rod 4 extending out of socket 16; The top of the support rod 4 is fixedly connected with a threaded part 15, which is threaded with a nut 6. The nut 6 is equipped with an edge ring 17, which is opposed to the support plate 2; The clamp plate 13 is equipped with a sealing cylinder 7, which is sliding connected with a piston block 14, which is fixedly connected to the bottom end of the support rod 4; The sealing cylinder 7 is respectively connected with a first air pipe 8 and a second air pipe 9; The connection between the first air pipe 8 and the sealing cylinder 7 is disposed at the bottom of the sealing cylinder 7, and the connection between the second air pipe 9 and the sealing cylinder 7 is disposed at the top of the sealing cylinder 7; The bottom plate 10 is respectively equipped with a first air outlet 11 and a second air outlet 12, which are connected to the first air pipe 8 and the second air pipe 9, respectively.

In the present disclosure, the strong magnetic power generation device 1 is installed on the vehicle body mounting seat 3, and the support plate 2 on the strong magnetic power generation device 1 is installed through the support rod 4. The nut 6 and the threaded part 15 are matched to fix and connect the top of the support rod 4 to the support plate 2, and the edge ring 17 is tightly attached to the support plate 2, further strengthening the connection strength between the support plate 2 and the support rod 4. The support rod 4 is inserted into the socket 16 on the support plate 2, and the cross-sectional shape of the socket 16 and the support rod 4 is elliptical, When strong magnetic power generation device 1 experiences vibration during operation, it will not rotate and can only follow the vibration of support rod 4 up and down.

When the strong magnetic power generation device 1 vibrates up and down with the support rod 4, the spring 5 absorbs energy and buffers the strong magnetic power generation device 1.

In one embodiment, when the strong magnetic power generation device 1 vibrates up and down, the support rod 4 drives the piston block 14 to move back and forth within the sealing cylinder 7, causing the piston block 14 to compress the air at both ends of the sealing cylinder 7. Due to the diameter of the first gas pipe 8 and the second gas pipe 9 being much smaller than the sealing cylinder 7, when the piston block 14 moves back and forth within the sealing cylinder 7, the sealing cylinder 7 is similar to a damper, which can slow down the vibration received by the strong magnetic power generation device 1.

At the same time, piston block 14 reciprocating compresses the air at the upper and lower ends of sealing cylinder 7. The air at the upper and lower ends of sealing cylinder 7 is discharged through the first air pipe 8 and the second air pipe 9, and is sprayed from the first air outlet 11 and the second air outlet 12 to the heat dissipation point of the strong magnetic power generation device 1, which can further strengthen the heat dissipation of the strong magnetic power generation device 1. At the same time, when piston block 14 compresses the air at the upper end of sealing cylinder 7, the lower end of sealing cylinder 7 absorbs air from the outside, and vice versa, Furthermore, it causes the air near the strong magnetic power generation device 1 to form a circulating flow, resulting in good heat dissipation effect.

Embodiment 3

Referring to FIGS. 1 to 10, the top surface of the nut 6 is equipped with a gear 19, and the bottom plate 10 is equipped with a limit plate 18. The limit plate 18 is attached to the edge of the support plate 2, and there is an opening 23 on the limit plate 18. The upper and lower sides of the opening 23 are both arranged as curved surfaces 24. The opening 23 is sliding connected to the inclined plate 20, and there is a sliding groove 21 on the inclined plate 20; The support plate 2 is equipped with a slide rail 26, which is equipped with a positioning plate 27. The positioning plate 27 is provided with a threaded hole 29, and the threaded hole 29 is connected with a plug rod 28. The inclined plate 20 slides inside the positioning plate 27, and the plug rod 28 slides inside the sliding groove 21. The limit plate 18 is equipped with a driving part 25, and the positioning plate 27 is fixedly connected to the output end of the driving part 25. The inclined plate 20 is fixedly connected with a push rod 22 that matches the gear 19.

In the present disclosure, when the strong magnetic power generation device 1 vibrates up and down with the support rod 4, the positioning plate 27 drives the inclined plate 20 to synchronously shake up and down with the strong magnetic power generation device 1 through the insertion rod 28. Due to the buffering and energy absorption of the spring 5 and the sealing cylinder 7, the amplitude of the vibration of the strong magnetic power generation device 1 is relatively small. The shape of the inclined plate 20 is similar to a triangular plate, and both sides of the inclined plate 20 are against the curved surface 24.

When the inclined plate 20 follows the synchronous shaking of the strong magnetic power generation device 1 up and down, the limit plate 18 does not move. As both sides of the inclined plate 20 are against the curved surface 24, when the inclined plate 20 moves downwards, the curved surface 24 presses against both sides of the inclined plate 20, causing the inclined plate 20 to move in the direction of the nut 6, causing the sharp end of the inclined plate 20 to be placed in the opening 23. The inclined plate 20 pushes the push rod 22 to move in the direction of the nut 6, and there are multiple fixed teeth on the push rod 22, which are opposed to the gear 19, As the push rod 22 moves towards the nut 6, the fixed teeth on the push rod 22 rotate the gear 19, causing the nut 6 to rotate in the direction of tightening, preventing the nut 6 from loosening, and further improving the stability of the strong magnetic power generation device 1 during operation.

The drive part 25 is an electric push rod. When the inclined plate 20 moves upwards, the drive part 25 pushes the positioning plate 27 inward, causing the push rod 22 to move away from the gear 19 and no longer fit with the gear 19. When pushed down by the upper and lower curved surfaces 24, the inclined plate 20 resets. At this time, the drive part 25 controls the push rod 22 to fit the gear 19 again, and there are multiple fixed teeth on the push rod 22. When the drive part 25 controls the push rod 22 to fit the gear 19, There will always be a fixed tooth that opposes the teeth on gear 19. By controlling the push rod 22 away from gear 19, it can prevent the gear 19 from loosening the nut 6 when the inclined plate 20 is reset.

The limit plate 18 is attached to the support plate 2 and has a limit effect on the strong magnetic power generation device 1. It is combined with the socket 16 and the support rod 4 to prevent left and right deviation when the strong magnetic power generation device 1 vibrates, ensuring that the strong magnetic power generation device 1 can only shake up and down.

There are two threaded holes 29 on the positioning plate 27, one that runs through one end of the positioning plate 27 and the other that is opened on the inner side of the positioning plate 27. The head and tail of the insertion rod 28 are both equipped with threaded grooves, and the two threaded grooves are matched with the two threaded holes 29. The middle of the insertion rod 28 is smooth, making it easy for the inclined plate 20 to slide on the insertion rod 28 through the sliding groove 21.

In one embodiment, when installing the strong magnetic power generation device 1, after tightening the nut 6, the push rod 22 is attached to the gear 19 on the nut 6. The port of the slide rail 26 is detachable. When installing the positioning plate 27 in the slide rail 26, the inclined plate 20 is placed inside the positioning plate 27. There are installation rails on the body mounting seat 3 and the bottom plate 10. The limit plate 18 is installed through the installation rails, and then fixed by the screws. When installing the limit plate 18, Place the inclined plate 20 in the opening 23. After installation, insert the insertion rod 28 into the threaded hole 29 and insert the insertion rod 28 into the sliding groove 21.

The above is only a preferred specific implementation of the present disclosure, but the scope of protection of the present disclosure is not limited to this. Any technical personnel familiar with the technical field who, within the scope of the disclosed technology, make equivalent replacements or changes based on the technical solution and inventive concept of the present disclosure should be covered within the scope of protection of the present disclosure.

What is claimed is:

1. A strong magnetic power generation on-board power device, comprising a strong magnetic power generation device (1) and a vehicle body mounting seat (3), characterized in that it also includes:
   a support plate (2) fixedly connected to the strong magnetic power generation device (1) for supporting and fixing the strong magnetic power generation device (1);
   a socket (16) is arranged on the support plate (2);
   a support rod (4) is inserted into the socket (16);
   a bottom plate (10) is arranged on the vehicle body mounting seat (3);
   a spring (5) is fixedly connected between the bottom plate (10) and the support plate (2);
   wherein the vehicle body mounting base (3) is equipped with a clamp plate (13), and the bottom plate (10) is arranged above the clamp plate (13);
   wherein the clamp plate (13) is equipped with a sealing cylinder (7), and the sealing cylinder (7) is sliding connected with a piston block (14), which is fixedly connected to a bottom end of the support rod (4).

2. The strong magnetic power generation on-board power device according to claim 1, characterized in that the socket (16) is elliptical, the support rod (4) is also elliptical, and a top of the support rod (4) extends out of the socket (16).

3. The strong magnetic power generation on-board power device according to claim 1, characterized in that a top end of the support rod (4) is fixedly connected with a threaded part (15), and the threaded part (15) is threaded with a nut (6) the nut (6) is provided with an edge ring (17), and the edge ring (17) is opposed to the support plate (2).

4. The strong magnetic power generation on-board power device according to claim 3, characterized in that a top surface of the nut (6) is equipped with a gear (19), the bottom plate (10) is equipped with a limit plate (18), the limit plate (18) is installed on the vehicle body mounting seat (3), the limit plate (18) is provided with an opening (23), and upper and lower sides of the opening (23) are arranged as curved surfaces (24), the opening (23) is sliding connected to an inclined plate (20), and a sliding groove (21) is opened on the inclined plate (20).

5. The strong magnetic power generation on-board power device according to claim 4, characterized in that the support plate (2) is equipped with a slide rail (26), the slide rail (26) is equipped with a positioning plate (27), the positioning plate (27) is provided with a threaded hole (29), the threaded hole (29) is connected with an insertion rod (28), the inclined plate (20) slides inside the positioning plate (27), and the insertion rod (28) slides inside the sliding groove (21), the limit plate (18) is equipped with a driving part (25), and the positioning plate (27) is fixedly connected to an output end of the driving part (25), the inclined plate (20) is fixedly connected with a push rod (22) that matches the gear (19).

6. The strong magnetic power generation on-board power device according to claim 1, characterized in that a first gas pipe (8) and a second gas pipe (9) are respectively connected within the sealing cylinder (7).

7. The strong magnetic power generation on-board power device according to claim 6, characterized in that a connection between the first gas pipe (8) and the sealing cylinder (7) is disposed at a bottom of the sealing cylinder (7), and a connection between the second gas pipe (9) and the sealing cylinder (7) is disposed at a top of the sealing cylinder (7).

8. The strong magnetic power generation on-board power device according to claim 7, characterized in that the bottom plate (10) is respectively provided with a first air outlet (11) and a second air outlet (12), and the first air outlet (11) and the second air outlet (12) are connected to the first air pipe (8) and the second air pipe (9), respectively.

* * * * *